(12) United States Patent
Cho

(10) Patent No.: US 7,042,601 B2
(45) Date of Patent: May 9, 2006

(54) IMAGE SCANNING MODULE IN MODULIZED CONFIGURATION

(75) Inventor: Chin-Fu Cho, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 907 days.

(21) Appl. No.: 10/032,505

(22) Filed: Jan. 2, 2002

(65) Prior Publication Data

US 2003/0076553 A1   Apr. 24, 2003

(30) Foreign Application Priority Data

Oct. 19, 2001   (TW) .............................. 90217889 U

(51) Int. Cl.
*H04N 1/46* (2006.01)

(52) U.S. Cl. ...................... 358/513; 358/475; 358/497; 358/471; 382/165; 382/137

(58) Field of Classification Search ................ 358/513, 358/475, 497, 471, 474; 382/165, 137, 135
See application file for complete search history.

(56) References Cited

U.S. PATENT DOCUMENTS 6,667,811 B1 * 12/2003 Katahira ..................... 358/1.14

* cited by examiner

*Primary Examiner*—Twyler Lamb
*Assistant Examiner*—Heather D. Gibbs
(74) *Attorney, Agent, or Firm*—Rosenberg, Klein & Lee

(57) ABSTRACT

The present invention provides an image scanning module including a first unit, a second unit, and a third unit. The first unit having a light source is used for retrieving a first image. The second unit is used for generating a second image by focusing the first image. The third unit is used for generating an electric signal responsive to the second image. The first unit, the second unit, and the third unit are modules discrete from each other.

3 Claims, 5 Drawing Sheets ical device (CCD) due to different scanning resolutions required. And, different reflectors are also needed due to lenses of different optical traces used. Accordingly, it is inconvenient to develop or modify the moulds used to produce various types of scanner.

IMAGE SCANNING MODULE IN MODULIZED CONFIGURATION

BACKGROUND OF THE INVENTION

1. Field of the Invention

The present invention relates to an image scanning module and, more particularly, to an image scanning module with cooperating units discrete from each other.

2. Description of the Related Arts

A scanner (image scanning module) is an essential and popular computer peripheral device nowadays. The scanner transfers photographs, texts and pictures on a scanned object into digital image files.

In general, the image scanning module arranges all required devices, such as lens, lamp, reflectors, and mounting devices, in one single and integral unit. However, the designer has to use different types of lenses and charge-coupled device (CCD) due to different scanning resolutions required. And, different reflectors are also needed due to lenses of different optical traces used. Accordingly, it is inconvenient to develop or modify the moulds used to produce various types of scanner.

FIG. 1 illustrates the structure of an image scanning module according to the prior art. According to FIG. 1, the image scanning module includes a carriage 11, a cover 12, a lamp 13, a lens 21, a lens supporter 22, at least a reflector (not shown), mounting devices (not shown), a first alignment device 27, a second alignment device 31, a third alignment device 32, and a CCD 33.

FIG. 2 illustrates a functional block of an image scanning module shown in FIG. 1. As shown in FIG. 1 and FIG. 2, the structure of the image scanning module is partitioned into two regions: a first region 1 and a second region 2. The first region 1 includes the carriage 11, the cover 12, the lamp 13, the lens 21, the lens holder 22, the reflector (not shown), and the mounting devices (not shown). The second region 2 includes the first alignment device 27, the second alignment device 31, the third alignment device 32, and the CCD 33. The original 10 to be scanned is disposed above the image scanning module before scanning.

As shown in FIG. 1 and FIG. 2, in the conventional image scanning module, most devices, such as the cover 12, the lamp 13, the lens 21, the lens holder 22, the reflector, and the mounting device are arranged in the carriage 11 of the first region 1. Therefore, the structure inside the carriage 11 becomes complicated.

As described above, as the modification of image scanning module is required, the conventional approach configuring most components in one single and integral unit is not a good design. Accordingly, there is request to develop an image scanning module with a modulized configuration.

SUMMARY OF THE INVENTION

The present invention provides an image scanning module including a first unit, a second unit, and a third unit. The first unit having a light source is used for retrieving a first image. The second unit is used for generating a second image by focusing the first image. The third unit is used for generating an electric signal responsive to the second image.

The first unit, the second unit, and the third unit are modules discrete from each other for achieving the objective of standardization, simplification, and easy mass production of the image scanning module to reduce the production cost and increase the productivity.

Additional objects and advantages of the invention will be set forth in the description which follows, and in part will be obvious from the description, or may be learned by practicing the invention.

DETAILED DESCRIPTION OF THE INVENTION

Figure 1:
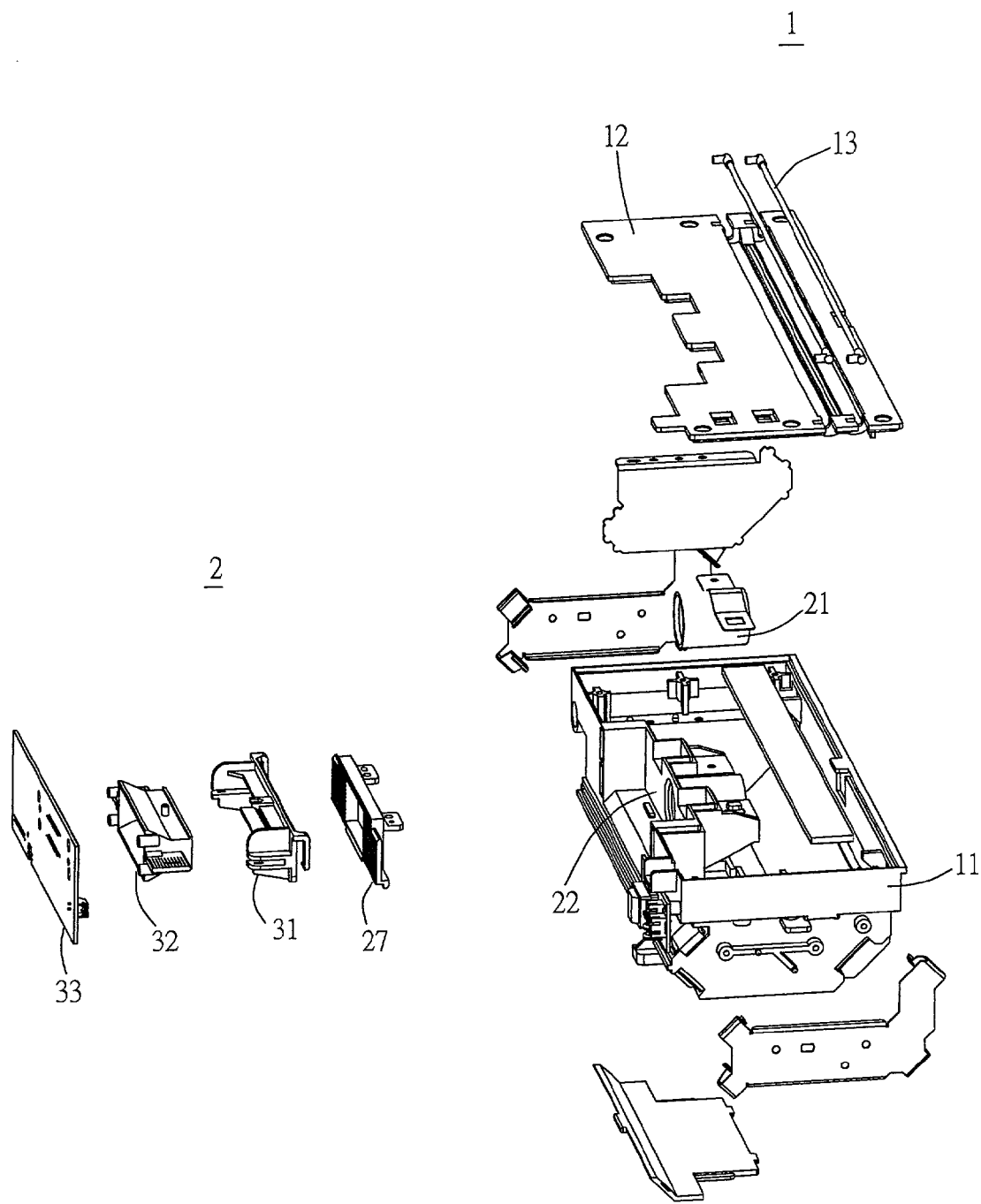
FIG. 1 illustrates the structure of an image scanning module according to the prior art.
Figure 2:
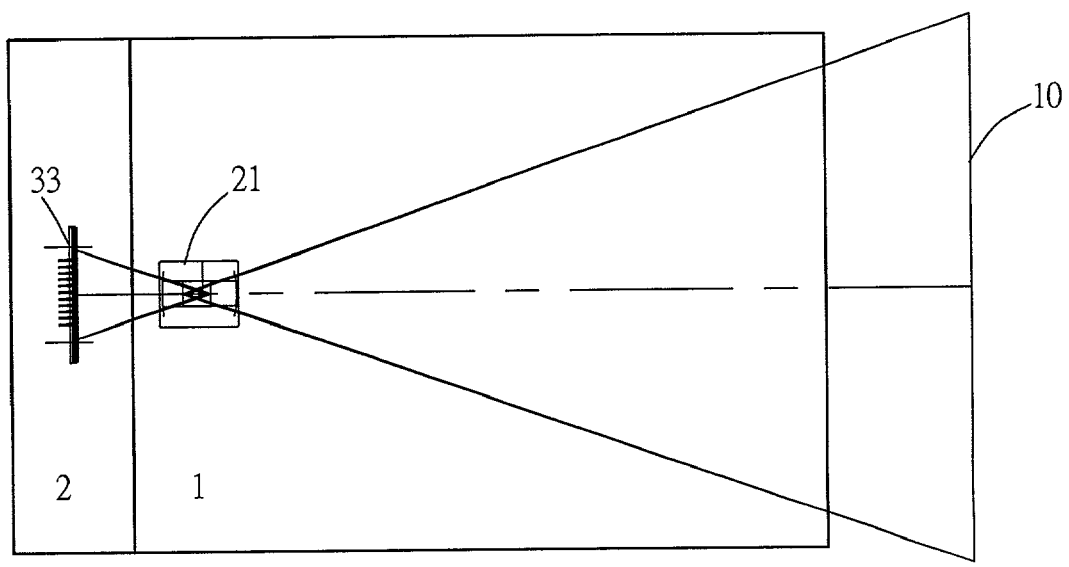
FIG. 2 illustrates a functional block of an image scanning module shown in FIG. 1.
Figure 3:
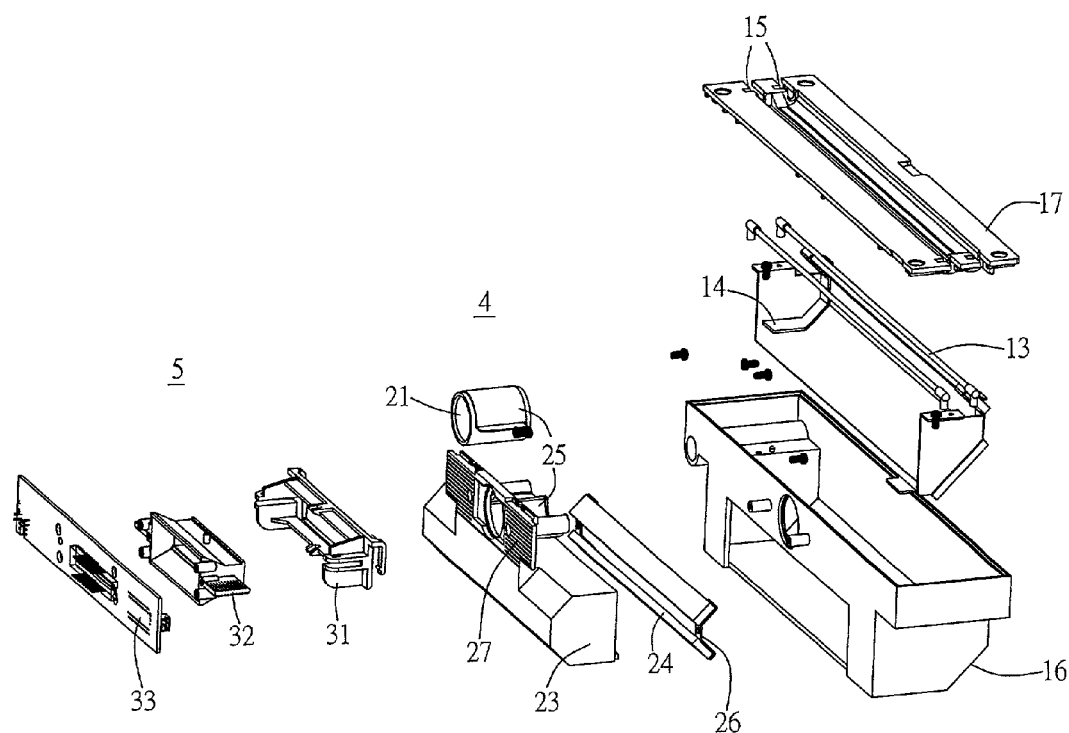
FIG. 3 illustrates the structure of an image scanning module in one embodiment of the present invention.
Figure 4:
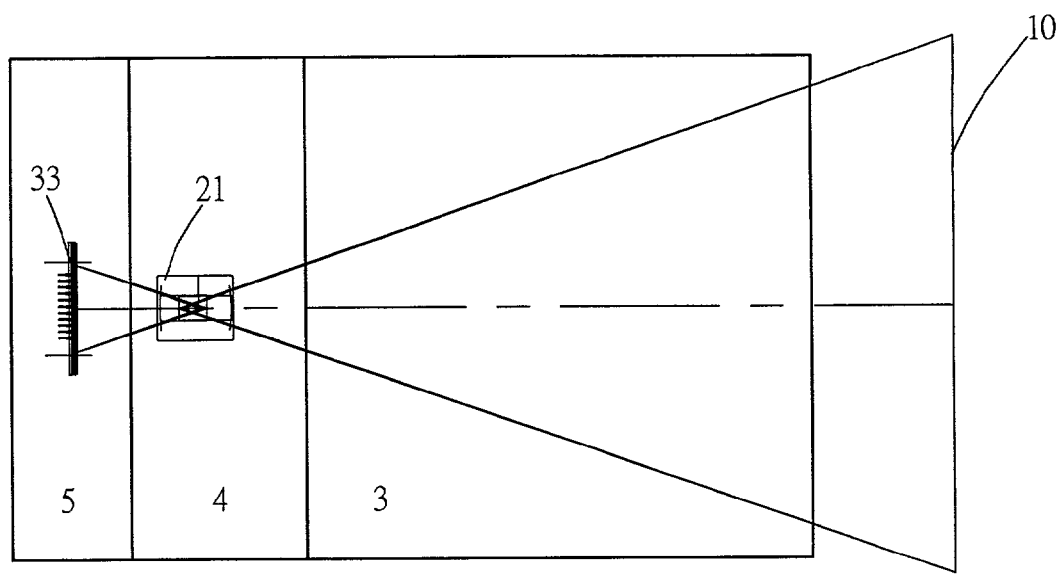
FIG. 4 illustrates a functional block of an image scanning module shown in FIG. 3.

As shown in FIG. 3, the structure inside the scanning module of the present invention is divided into three units: a first unit 3, a second unit 4, and a third unit 5. The first unit 3 having a lamp 13 is used for retrieving a first image. The second unit 4 is used for generating a second image by focusing the first image. The third unit 5 is used for generating an electric signal responsive to the second image. The first unit 3, the second unit 4, and the third unit 5 are modules discrete from each other. However, those units are connected as shown in FIG. 4 to form the scanning module.

As shown in FIG. 3, the first unit 3 includes a lamp 13, a carriage 16, a cover 17, at least a reflector (not shown), and a mounting device 14.

The lamp 13 is used for generating a light signal. The cover 17 disposed above the carriage 16 has a hole 15. The light signal passes through the hole 15 and impinges on the original. The light reflected from the original (not shown) generates the first image. The reflector (not shown), made of glass mounted in the carriage 16 with the mounting device 14, is operative to receive the first image and reflect the first image to the second unit 4.

As shown in FIG. 3, the second unit 4 includes a lens 21, a lens supporter 23, a reflector 24, a lens clip 25, a mounting device 26, and a first alignment device 27.

The lens 21 is disposed on the lens supporter 23 and mounted with a lens clip 25. The reflector 24 made of glass is mounted in the lens supporter 23 for retrieving the first image and projecting the first image to the lens 21 to generate a second image. The first alignment device 27 made by plastic is positioned between the lens 21 and the third unit 5 for adjusting the focus of the lens 21.

As shown in FIG. 3, the third unit 5 includes a second alignment device 31, a third alignment device 32, and a charge-coupled device (CCD) 33.

The second alignment device 31 made by plastic is positioned between the first alignment device 27 and the third alignment device 31 for vertically adjusting the focus of the lens 21. The third alignment device 32 made by plastic is positioned between the second alignment device 31 and the CCD 33 for horizontally adjusting the focus of the lens 21.

The cover 17 of the first unit 3 has a glass plate (not shown). Prior to the scan operation, the original 10 is placed on the glass plate. The light signal from the lamp 13 passes through the glass plate and impinges on the original 10 placed thereon to generate the first image. The reflectors (not shown) in the carriage 16 are operative to retrieve and transmit the first image to the second unit 4.

The reflector 24 in the second unit 4 receives the first image and reflects the first image to the lens 21. The lens 21 transmits the second image to the third unit 5.

After the second image is transmitted to the third unit 5, the lens 21 transmits the second image to the CCD 33. Then, the CCD 33 generates an electric signal, and the scanning process is completed. Furthermore, the third alignment device 32 is used for mounting the CCD 33 and preventing the second image from dissipation. The second image is therefore transmitted to the CCD 33 substantially without loss.

The image scanning module of present invention isolates and disposes critical components in the second unit 4. The image scanning module of present invention disposes other non-critical components in the first unit 3 and the third unit 5. The first unit 3 and the third unit 5 may be used to combine other design of second unit 4 to yield different scanning resolution.

In accordance with the present invention, by adjusting devices, such as reflectors, CCD 33, and changing the devices, such as the lens 21 and the reflector 24, various scanning resolutions combination are possible.

Figure 5:
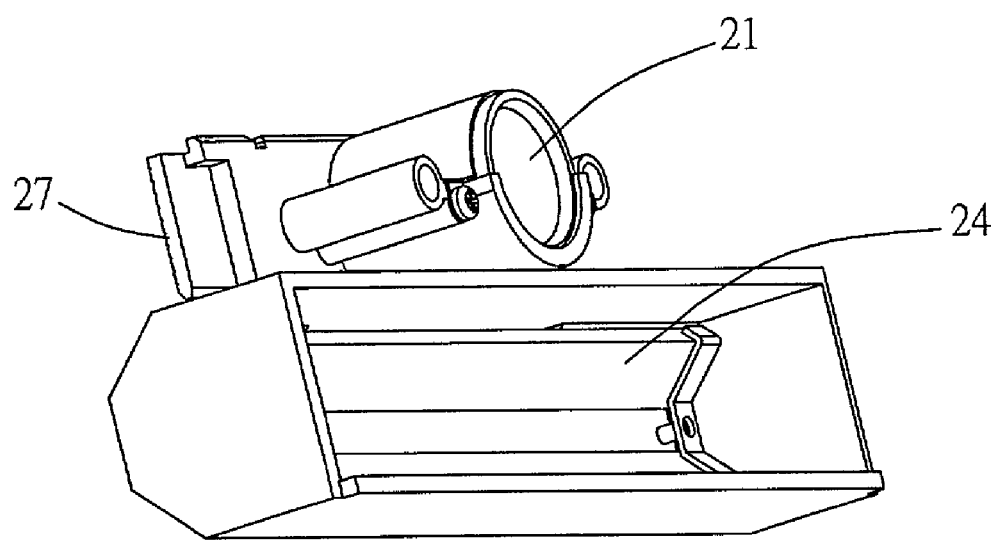
FIG. 5 illustrates the structure of the second unit 4 of the image scanning module shown in FIG. 3.

From FIG. 5, the second unit 4 includes lens 21, reflector 24, and the first alignment device 27. For a required scanning resolution, a corresponding lens 21 is first selected. Afterwards, the reflector 24 and the first alignment device 27 are accordingly adjusted to calibrate the optical trace and focal distance. With the design of second unit 4, the desired scanning resolution is obtained easily.

It is obvious that the image scanning module of the present invention eliminates the drawbacks of the conventional image scanning modules. The present invention integrates the structure inside the scanning module with standardized components and makes the structure less complex by separating the first unit 3, the second unit 4, and the third unit 5 from each other. Therefore, users can simply make change to devices, such as the reflectors, the CCD, and the lens, to acquire desired scanning resolutions. Furthermore, the manufacturing cost is reduced by standardizing the components in the first unit 3 and the third unit 5. It is apparent that the present invention substantially improves design and production aspects of the image scanning module.

The objective of the present invention is achieved by integrating the commercially available components. Since lens and reflectors are the key components to the scanning resolution, the present invention integrates the lens and the reflectors into an independent unit. This approach allows use of this independent unit to produce different types of image scanning modules of different scanning resolutions. With the approach of the independent unit, the mould modification process becomes simpler. Furthermore, the manufacturing cost is reduced also by the present invention.

In the foregoing specification the invention has been described with reference to specific embodiments. It will, however, be evident that various modification and changes may be made to thereto without departing from the broader spirit and scope of the invention. The specification and drawings are, accordingly, to be regarded in an illustrative rather than restrictive sense. Thus, it is intended that the present invention covers the modification and variations of this invention provided they come within the scope of the appended claims and their equivalents.

What is claimed is:

1. An image scanning module, comprising:
   a first unit for retrieving a first image;
   a second unit for generating a second image by focusing said first image, said second unit including:
     a lens;
     a lens supporter for supporting said lens;
     a lens clip for affixing said lens on said lens supporter;
     at least a reflector positioned inside said lens supporter for receiving said first image and projecting said first image to said lens to generate said second image;
     a mounting device for mounting said reflector; and
     a first alignment device for adjusting a focus of said lens; and
   a third unit for generating an electric signal responsive to said second image, said first alignment device being positioned between said lens and said third unit;
   wherein said first unit, said second unit, and said third unit are modules discrete from each other.

2. The image scanning module according to claim 1, wherein said third unit comprising:
   a charge-coupled device (CCD) for retrieving said second image to generate said electric signal;
   a second alignment device; and
   a third alignment device, being positioned between said CCD and said second alignment device, for horizontally adjusting said focus of said lens;
   wherein said second alignment device is positioned between said first alignment device and said third alignment device, for vertically adjusting said focus of said lens.

3. The image scanning module according to claim 2, wherein said third alignment device positions said CCD and prevents said second image from dissipation, so as to transfer said second image to said CCD substantially without loss.

* * * * *